(12) United States Patent
Graetz et al.

(10) Patent No.: US 8,268,288 B2
(45) Date of Patent: *Sep. 18, 2012

(54) REGENERATION OF ALUMINUM HYDRIDE

(75) Inventors: Jason Allan Graetz, Calverton, NY (US); James J. Reilly, Bellport, NY (US); James E. Wegrzyn, Brookhaven, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 544 days.

This patent is subject to a terminal disclaimer.

(21) Appl. No.: 12/426,367

(22) Filed: Apr. 20, 2009

(65) Prior Publication Data
US 2009/0291045 A1 Nov. 26, 2009

Related U.S. Application Data

(63) Continuation-in-part of application No. 11/831,297, filed on Jul. 31, 2007, now Pat. No. 7,521,037.

(60) Provisional application No. 60/834,521, filed on Aug. 1, 2006.

(51) Int. Cl.
*C01B 6/06* (2006.01)

(52) U.S. Cl. ....................................... 423/645

(58) Field of Classification Search .................. 423/645
See application file for complete search history.

(56) References Cited

U.S. PATENT DOCUMENTS

| | | | |
|---|---|---|---|
| 3,159,626 A * | 12/1964 | Ashby | 544/225 |
| 3,344,079 A * | 9/1967 | Ashby | 252/188.27 |
| 3,453,089 A | 7/1969 | Del Giudice | |
| 3,642,853 A * | 2/1972 | Murib et al. | 556/176 |
| 3,651,064 A | 3/1972 | Nelson et al. | |
| 3,664,811 A * | 5/1972 | Scruggs | 423/645 |
| 3,764,666 A * | 10/1973 | Murib | 423/645 |
| 4,730,070 A | 3/1988 | Marlett et al. | |
| 4,782,171 A | 11/1988 | Marlett et al. | |
| 4,866,191 A | 9/1989 | Marlett et al. | |
| 4,957,726 A | 9/1990 | Marlett et al. | |
| 6,471,935 B2 | 10/2002 | Jensen et al. | |
| 7,521,037 B1 * | 4/2009 | Graetz et al. | 423/645 |
| 2001/0038821 A1 * | 11/2001 | Petrie et al. | 423/645 |
| 2007/0025908 A1 * | 2/2007 | Sandrock et al. | 423/644 |
| 2008/0241056 A1 * | 10/2008 | McGrady | 423/645 |

OTHER PUBLICATIONS

Wang, Jun et al, "Synthesis of Metal Complex Hydrides for Hydrogen Storage", Jouirnal of Physical Chemistry C (2007), 111 (40), 14917-14924.*
Wang, et al., "Physiochemical Pathway for Cyclic Dehydrogenation and Rehydrogenation of LiAlH$_4$," *J. Am. Chem. Soc.*, 128: 5949-5954 (2006).
Birnbaum, et al., "Hydrogen in Aluminum", *J. of Alloys and Compounds*, 253-254: 260-264 (1997).

(Continued)

*Primary Examiner* — Wayne Langel
(74) *Attorney, Agent, or Firm* — Dorene M. Price

(57) ABSTRACT

The present invention provides methods and materials for the formation of hydrogen storage alanes, $AlH_x$, where x is greater than 0 and less than or equal to 6 at reduced $H_2$ pressures and temperatures. The methods rely upon reduction of the change in free energy of the reaction between aluminum and molecular $H_2$. The change in free energy is reduced by lowering the entropy change during the reaction by providing aluminum in a state of high entropy, and by increasing the magnitude of the change in enthalpy of the reaction or combinations thereof.

17 Claims, 2 Drawing Sheets

OTHER PUBLICATIONS

Konovalov, et al., "The P,T-State Diagram and Solid Phase Synthesis of Aluminium Hydride", *Inorg. Chem.*, 34: 172-175 (1995).

Baranowski, et al., "The Equilibrium Between Solid Aluminium Hydride and Gaseous Hydrogen", *Phys. Chem.*, 135: 27-38 (1983).

Brower, et al., "Preparation and Properties of Aluminum Hydride", *J. Am. Chem. Soc.*, 98: 2450-2453 (1976).

Ashby, E.C., "The Direct Synthesis of Amine Alanes", *J. Am. Chem. Soc.*, 86: 1882-1883 (1964).

Finholt, et al., "Lithium Aluminum Hydride, Aluminum Hydride and Lithium Gallium Hydride, and Some of their Applications in Organic and Inorganic Chemistry", *J. Am. Chem. Soc.*, 69: 1199-1203 (1947).

Ashby, E.C., "The Direct Synthesis of Complex Metal Hydrides", Inorganic Chemistry, vol. 2 (3), p. 499-404, (Jun. 1963).

Ashby, E.C., "The Direct Synthesis of Amine Alanes", J. Am. Chem. Soc., vol. 86, p. 1882-1883, (1964).

Farkas, et al., Triethylenediamine; "A new Bicyclic Intermediate and Catalyst for Making Polyurethane Foams", Industrial and Engineering Chemistry, vol. 51 (10), p. 1299-11300 (Oct. 1959).

Ashby, E.C., "The Composition of Complex Metal Hydrides in Polar Solvents", I. Tertiary Amines; Inorganic Chemistry, vol. 9 (4), p. 855-862, (Apr. 1970).

Farkas, et al., Triethylenediamine; "Physical, Chemical, and Catalytic Properties", Journal of Chemical and Engineering Data, vol. 4 (4); p. 334-335, (Oct. 1959).

Graetz, et al., "Regeneration of Lithium Aluminum Hydride", *J. Am. Chem. Soc.*, vol. 130 (52), p. 17790-17794 (2008).

Graetz, et al. Direct and Reversible Synthesis of $AlH_3$-Triethylenediamine from Al and $H_2$, *J. Am. Chem. Soc.*, vol. 111 (51), p. 19148-19152, (2007).

* cited by examiner

REGENERATION OF ALUMINUM HYDRIDE

CROSS REFERENCE TO RELATED APPLICATIONS

The application is a continuation-in-part of U.S. patent application Ser. No. 11/831,297 filed on Jul. 31, 2007, now U.S. Pat. No. 7,521,037, which claims benefit of provisional application No. 60/834,521, filed Aug. 1, 2006, the entirety of both applications being incorporated herein by reference.

The present invention was made with government support under Contract No. DE-AC02-98CH10886 awarded by the U.S. Department of Energy. The United States government has certain rights in the invention.

BACKGROUND OF THE INVENTION

The future of hydrogen as an energy source is dependent upon the development of storage media with high volumetric and gravimetric capacities. Hydrogen storage has been identified as the bottleneck in the development of hydrogen-fueled vehicles. Conventional storage methods (e.g. compressed gas and liquid $H_2$) will likely be inadequate for automotive applications due to issues of safety, volumetric $H_2$ capacity and cost. An alternative to these more traditional methods is to store the hydrogen in the solid state. This can be accomplished with adsorbents (e.g. carbon), where hydrogen is attached to the surface of a solid, or absorbents (e.g. metal hydrides), where hydrogen is inserted in between the atoms in a solid. The key requirements for any candidate hydrogen storage material in automotive applications are high gravimetric and volumetric hydrogen densities, a release of hydrogen at moderate temperatures and pressures, and a low-cost method to recharge the material back to its original state. The hydrogen storage system goals for the year 2010 are a 6.0 weight percent (6.0 wt %) gravimetric capacity and a volumetric capacity of 0.045 kg/L. Conventional metal hydrides that can readily supply hydrogen at room temperature have storage capacities <2 wt % and therefore cannot satisfy these goals.

Aluminum hydride, $AlH_3$, is an attractive alternative to the traditional metal hydrides. It has a volumetric hydrogen capacity (1.48 kg/L) greater than that of liquid hydrogen and a gravimetric hydrogen capacity exceeding 10 wt %. $AlH_3$ is stable at room temperature despite an equilibrium hydrogen pressure of around 7 kbar (or a fugacity of $5 \times 10^5$ bar) at 298K [1]. In general, the rapid low temperature kinetics and high energy density make $AlH_3$ an unusual and promising hydrogen storage medium for a number of applications.

However, the conventional organometallic synthesis is a costly procedure and $AlH_3$ is not a reversible hydride at moderate $H_2$ pressures. Incorporating dopants or catalytic additives is not likely to produce the large thermodynamic changes required to substantially reduce the equilibrium pressure. Therefore, the utility of this material will depend upon the development of techniques to regenerate $AlH_3$ from the spent Al powder in a cost effective and energetically efficient manner. The present invention addresses methods to regenerate alanes ($AlH_x$) from Al by decreasing the change in free energy during the hydrogenation reaction.

There have been a few prior attempts to hydrogenate Al to form $AlH_x$. Baranowski and Tkacz claimed to form $AlH_3$ from Al metal using high-pressure hydrogen (28 kbar) at 300 C [2], however this pressure is much too low in view of the free energy of formation for $AlH_3$ via the direct reaction of Al metal with $H_2$ gas. Although this method is the most direct ($AlH_3$ is formed from crystalline Al and $3/2H_2$), the $H_2$ pressures required are much too large to be practical for any application (28 kbar is approximately thirty times the pressure at the bottom of the Mariana Trench, 11 km below sea level).

Birnbaum et al. [3] have made attempts to hydrogenate Al by electrochemical charging, chemical charging and by exposure to an ultrasonic field. These experiments resulted in small amounts of hydrogen uptake by the Al with concentrations of less than 2500 atomic parts per million (one quarter of 1% H in Al). These methods are costly, inefficient and do not form $AlH_x$ in high enough yields to make it a practical hydrogen fuel source.

The conventional wet chemistry procedure for synthesizing $AlH_3$ is through an ethereal reaction of an alkali alanate (e.g. $LiAlH_4$, $NaAlH_4$) with aluminum chloride ($AlCl_3$) [4] as shown in reaction (1):

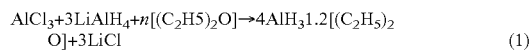

$$AlCl_3 + 3LiAlH_4 + n[(C_2H_5)_2O] \rightarrow 4AlH_3 1.2[(C_2H_5)_2O] + 3LiCl \quad (1)$$

A non-solvated form of $AlH_3$ was initially prepared by Chizinsky et al. [5] and subsequently by Brower et al. [6] by heating in the presence of a complex metal hydride under reduced pressure. The synthesis was extremely sensitive to the desolvation conditions (e.g. temperature and time) and small alterations lead to the precipitation of different $AlH_3$ polymorphs. $\gamma$-$AlH_3$ formed in the presence of excess $LiAlH_4$, while $\beta$-$AlH_3$ formed in the presence of excess $LiAlH_4$ and $LiBH_4$ [5]. In both cases, a slightly higher temperature (70 C) and/or a longer heating time lead to the formation of $\alpha$-$AlH_3$. Although this procedure can be used to make pure $AlH_3$, the cost of the starting materials ($LiAlH_4$ and $AlCl_3$) would be too high for widespread applications of $AlH_3$ as a hydrogen storage material.

The present invention introduces new methods for regeneration of $AlH_x$ at reduced $H_2$ gas pressures and temperatures through consideration of and adjustment for basic principles of the thermodynamics of the regeneration reaction.

DETAILED DESCRIPTION OF THE INVENTION

The present invention involves a method to form $AlH_x$ from Al at a reduced $H_2$ gas pressure (<28 kbar at 300 C). This method operates by lowering the change in free energy that occurs during the hydrogenation reaction. One method includes forming $AlH_x$ in a state of high entropy to lower the entropy change during hydrogenation. Another method involves using an alloy or Al compound or $AlH_x$ adduct to increase the magnitude of the enthalpy change of hydrogenation. A reduction in the entropy change, and/or an increase in the magnitude of the enthalpy change, serves to lower the total free energy change and thereby reduce the hydrogen equilibrium pressure. Because the hydrogen equilibrium pressure scales exponentially with the free energy, small changes in the free energy will result in large changes in the minimum $H_2$ pressure required to form $AlH_x$.

This invention consists of a method to form alane, $AlH_x$ (where $0 < x < 6$), from Al and $H_2$ gas. In this method, the $H_2$ equilibrium pressure (H$_2$ pressure required for hydrogenation) is reduced by lowering the total free energy of hydrogenation. In a preferred embodiment of the present invention x=3 and the resultant alane is AlH$_3$. In various embodiments of the present invention, the H$_2$ pressure required for hydrogenation is less than or equal to 28 kbar at 300 C. In various embodiments of the present invention the required H$_2$ pressure varies from 1 bar to 28 kbar, or from 1 bar to 25 kbar, or from 100 bar from 19 kbar, or from 1 kbar to 10 kbar. The hydrogenation of Al by H$_2$ gas occurs when the pressure of the gas is above the equilibrium H$_2$ pressure (P$_{eq}$), which is given by equation (2):

$$P_{eq} = \exp[2\Delta G/xRT], \quad (2)$$

where $\Delta G$ is the change in the Gibbs free energy (in units of moles AlHx), x is the molar ratio H/Al, R is the molar gas constant (R=8.314 J/mol K) and T is the temperature. In the hydrogenation reaction, the change in the Gibbs free energy is given by:

$$\Delta G = \Delta H - T\Delta S \quad (3)$$

where $\Delta H$ and $\Delta S$ are the enthalpy and entropy of the reaction, respectively. Combining equations 2 and 3 gives the relationship between the H$_2$ equilibrium pressure (the minimum pressure required for hydrogenation) and the entropy change:

$$P_{eq} = \exp[2(\Delta H - T\Delta S)/xRT] \quad (4)$$

Figure 1:
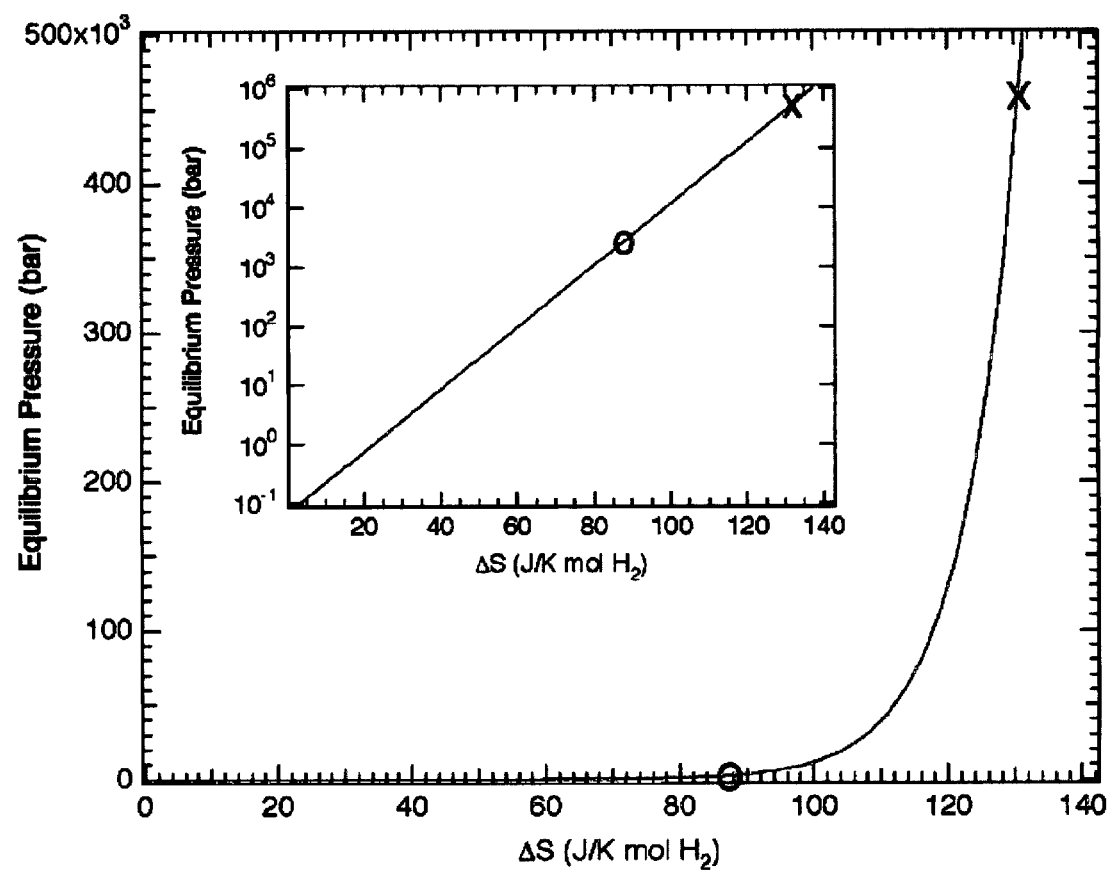
FIG. 1. Equilibrium $H_2$ pressure at 298 K as a function of $\Delta S$ calculated from equation 4. The x markers indicate the pressure for the standard entropy of $H_2$ gas (130.7 kJ/K mol $H_2$), while the o markers represent a 33% reduction in $\Delta S$ (88 kJ/K mol $H_2$).

Equation (4) is plotted in FIG. 1 using x=3 (for AlH$_3$), T=298 K (room temperature) and $\Delta H$=−9.9 kJ/mol AlH$_3$ [6]. This plot clearly demonstrates how a small decrease in the entropy change corresponds to a large reduction in the equilibrium pressure. For example, a reduction of $\Delta S$ by 33% lowers the equilibrium pressure by more than two orders of magnitude. Similarly, a small increase in the magnitude of the enthalpy of hydrogenation will significantly reduce the H$_2$ equilibrium pressure.

Figure 2:
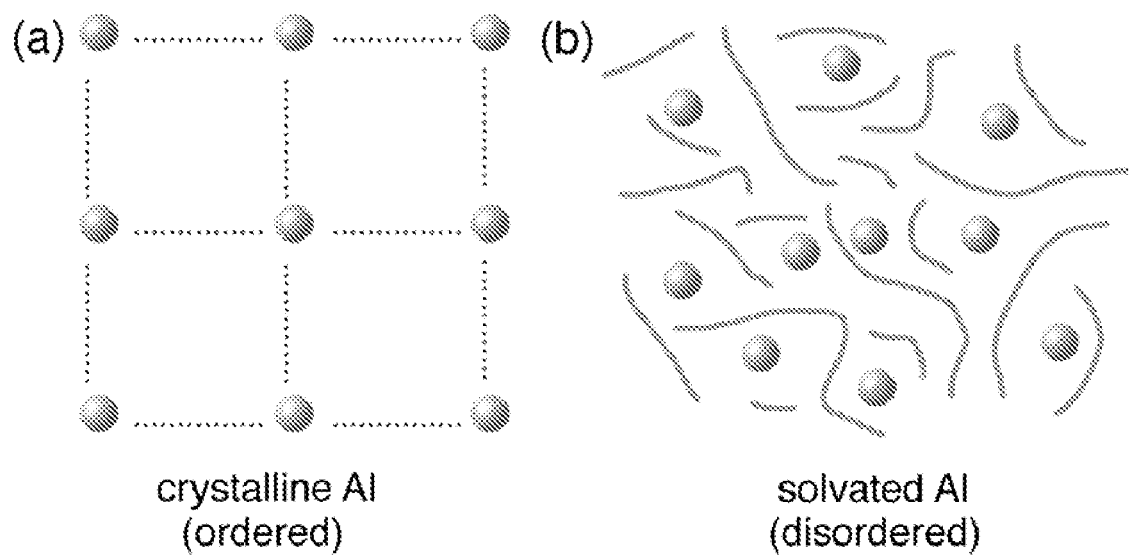
FIG. 2. Schematic representation of Al (a) as a crystalline solid and (b) as a solvated species in the liquid or solid state.

The H$_2$ equilibrium pressure can be significantly reduced by decreasing the entropy difference between the initial state before hydrogenation: Al (in some form)+H$_2$ (gas) and the final state after hydrogenation: AlH$_x$. The entropy of any system can be described by Boltzmann's epitaph, equation (5):

$$S = k_B \ln(W) \quad (5)$$

where the symbol "k-subscript B" (i.e., $k_B$) is the Boltzmann constant and W is the number of different equivalent configurations of the system. The entropy of a solid contains contributions from configurational, electronic, vibrational, and other components. When Al is in its common crystalline form (face centered cubic) each Al atom occupies a lattice site that is energetically equivalent to all other lattice sites (FIG. 2a). In this case, the entropy is low because there is essentially only one site available to each atom. However, in a system where the atoms have more vibrational and rotational freedom, they lack the long-range order of a crystal, as in FIG. 2b. In this case the entropy is high because there are many different energetically equivalent states available for a given Al atom. The entropy change that occurs when a H atom is taken from a gas (where a large number of equivalent configurations are available) and put into an ordered solid is typically large. However it may be possible to lower this entropy change upon hydrogenation by first forming AlH$_x$ in a state of high entropy. This may be accomplished by using Al prepared in such a variety of states, such as an amorphous metal, a collection of nanoparticles, or by dissolving Al or an ionic Al compound (e.g. AlCl$_3$) in a solvent (e.g. diethyl ether, THF, toluene, benzene, etc.).

Increasing the magnitude of $\Delta H$ can also reduce the change in free energy during hydrogenation and thereby decrease the H$_2$ equilibrium pressure. One method to make $\Delta H$ more negative is by including additional metal atoms to form a more stable hydride. The formation enthalpy of AlH$_3$ is −9.9 kJ/mol AlH$_3$. However, this value can be made more negative by introducing a metal atom M at a molar concentration, n, to stabilize the hydride (AlM$_n$H$_x$). This method is commonly used in conventional metal hydrides to destabilize the system and increase the H$_2$ equilibrium pressure. Typically, M is a metal atom that does not form a stable hydride, such as iron. By contrast, the present invention makes use of the reverse application, i.e., using a metal that forms a stable hydride (e.g. Ti) to increase the magnitude of $\Delta H$ and lower the H$_2$ equilibrium pressure. The magnitude of the AlH$_x$ formation enthalpy can also be increased by using a molecule that forms an adduct (such as an amine) or a solvated phase (such as an ether) with AlH$_x$. In this case the Al metal is directly hydrogenated in the presence of a stabilizing molecule (S) to form an AlH$_x$ adduct (AlH$_x$—S).

The present invention can be used in a variety of ways for a number of different applications. The common theme among these applications is the hydrogenation of Al using H$_2$ gas to form a more stable AlH$_x$ species. One form of this invention includes the direct hydrogenation of Al dissolved in a solvent (liquid state) or solvated Al (solid state) with a stabilizing molecule.

Other forms of this invention involve the hydrogenation of Al (as a liquid or solid) as an adduct or complex with a stabilizing molecule (an amine or an ether) followed by the removal of the stabilizing molecule to form one of the crystalline phases of AlH$_3$ ($\alpha$, $\alpha'$, $\beta$, $\gamma$, $\delta$, $\epsilon$, $\zeta$). Although this method requires the extra step of solvent removal, typically performed by heating in the presence of a complex metal hydride under reduced pressure or by precipitation from solution, the final product will have greater gravimetric capacity (~10 wt %) due to the removal of the solvent molecules. The full regeneration process, which includes the formation of a stable alane adduct (AlH$_x$—S) followed by separation of the stabilizing molecule from the alane and alane recovery, is shown in Equation (6) as follows:

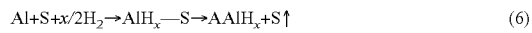
$$Al + S + x/2 H_2 \rightarrow AlH_x\text{—}S \rightarrow AAlH_x + S\uparrow \quad (6)$$

A preferred embodiment of the present invention applies new methods to form AlH$_3$ from Al and H$_2$ gas at reduced H$_2$ pressures and temperatures. However, another embodiment the methods of the invention can be used to generate the complex alanates, many of which may be useful for hydrogen storage applications. Similar to AlH$_3$, a number of alanates are metastable or unstable at room temperature (e.g. LiAlH$_4$, Ti(AlH$_4$)$_4$) and can not be regenerated using moderate H$_2$ gas pressures. Therefore, lowering the free energy change (by decreasing the entropy change and/or increasing the magnitude of the enthalpy) during hydrogenation may significantly reduce the H$_2$ equilibrium pressures.

There are likely to be a number of different methods to lower the free energy change associated with the hydrogenation reaction. This can be accomplished by lowering the entropy change by forming an AlH$_x$ species in a state of high entropy. A few examples of such systems are dissolved AlH$_x$ in a liquid phase, an AlH$_x$ polymer, an amorphous AlH$_x$ solid, a solvated AlH$_x$ solid, AlH$_x$ nanoparticles suspended in an inert matrix.

Two embodiments for the alteration of $\Delta H$ are relevant. As noted in equation 4, $\Delta H$ also influences $\Delta G$ and as the overall reaction(s) become more exothermic, $\Delta G$ becomes more negative and P$_{eq}$ is reduced. In conventional metal hydrides an embodiment involves introducing another metal component in part for the original metal in order to reduce or increase the equilibrium pressure. Such a substitution may also be useful in the present instance.

REFERENCES

[1] J. Graetz and J. Reilly J. Alloys Comp. In press (2006).
[2] Baranowski, B.; Tkacz, M. Z. Phys. Chem. 135 27. (1983).
[3] H. K. Birnbaum, C. Buckley, F. Zeides, E. Sirois, P. Rozenak, S. Spooner, J. S. Lin, J. Alloys Comp. 253 260 (1997).
[4] Finholt, A. E.; Bond, Jr., A. C.; Schlesinger H. I. J. Am. Chem. Soc. 69 1199 (1947).
[5] Chizinsky, G.; Evans, G. G.; Gibb Jr, T. R. P.; Rice Jr, M. J. J. Am. Chem. Soc., 77 3164 (1955).
[6] Brower, F. M.; Matzek, N. E.; Reigler, P. F.; Rinn, H. W.; Roberts, C. B.; Schmidt, D. L.; Snover, J. A.; Terada K. J. Am. Chem. Soc., 98 2450 (1976).

METHODS OF THE INVENTION

Embodiments of the present invention present new methods for hydrogenation of aluminum or an aluminum species in the presence of a reactive solvent to form aluminum hydride ($AlH_x$ where x is greater than 0 and less or equal to 6) or an aluminum hydride adduct. The hydrogenation occurs by exposing the reactants to high-pressure hydrogen gas. The reactants include Al or an Al compound and a stabilizing molecule. The methods may include:

(1) Starting material (Al+stabilizing molecule): The starting material consists of Al and a stabilizing agent and can exist as a liquid solution or a slurry (solids and liquids). Al is provided in the form of bulk powder, activated powder, nanostructured/nanoscale Al or as an aluminum halide ($AlF_3$, $AlCl_3$, $AlBr_3$). In these examples activated aluminum is prepared by the decomposition of previously prepared $AlH_3$. In preferred embodiments, the stabilizing molecule is selected from a number of non-aqueous solvents containing amine groups, amide groups, hydroxyl groups, or any of the oxygen-based solvents such as dibutyl ethers and ketones. Specific solvents may include, without limitation, diethyl ether, tetrahydrofuran (THF), dibutyl ether, undecane, dodecane, triethylamine, ethylenediamine, dimethylethylamine, trimethylamine, tetramethylethylenediamine, quinuclidine, hexamine, ethylene glycoldimethylether, diethylethylene diamine, and triethyl Al. In the latter case, Al is already present and need not be introduced. Some specific solvents may serve both as solvent and as stabilizing molecule. In many embodiments, however, both a solvent and a stabilizing molecule are present during the formation of the $AlH_x$—S adduct. In some embodiments, a first stabilizing molecule is displaced by transamination using a second stabilizing molecule prior to separation from the alane and recovery of the alane. In such embodiments, triethylamine (TEA) is a preferred second stabilizing molecule.

(2) Hydrogenation: The solvated Al is hydrogenated under $H_2$ gas at pressures less than 28 kbar (and generally less than about 10,000 psi) and temperatures less than 300 C. The solvated Al may be in a liquid, a solid or semi-solid form. The reactants may be stirred or agitated to enhance the rate of hydrogen uptake. Although a catalyst is not necessary, a catalyst may enhance the rate of hydrogenation. Appropriate catalysts may be selected from transition metals (e.g., Ti, V, Fe, Co, Ni, Pd, etc.) or transition metal compounds (e.g., $TiCl_2$, $TiF_3$, $C_{16}H_{36}O_4Ti$, $ZrCl_3$, etc.).

(3) Alane recovery: One method of recovering $AlH_x$ from the stabilizing molecule is by vacuum drying at temperatures between 30 and 90 C. This process may be enhanced when a desolvating species is present such as a complex metal hydride ($LiAlH_4$, $LiBH_4$) or a metal halide (e.g., LiCl). Another method is by precipitating $AlH_x$ directly from solution by techniques described in Brower, et al. (1976). The desolvating species can be removed with a solvent that preferentially dissolves the desolvating species over the metal hydride. The desolvating species can also be removed with a solvent that preferentially dissolves the metal hydride over the desolvating species (see U.S. Pat. No. 3,453,089 to Guidice, the contents of which are incorporated herein by reference). After removal the desolvating species can be recovered for further use.

In other embodiments it is preferred that the solvent remain present and therefore the desolvation step is not practiced. In this embodiment, hydrogen can be added and removed reversibly from the solvated $AlH_x$, which can exist as a liquid or solid.

The class of solvent-assisted hydrogenation reactions described herein are used to produce amine alane from the mixture of THF, activated Al powder and triethylenediamine under 500 psi $H_2$ pressure at 70 C (Ashby, E. C., J. Amer. Chem. Soc. 86: 1882 (1964)).

Other specific embodiments include:

A. Activated Al powder+THF+$H_2$→$AlH_3$-THF (similar to the methods described by Wang et al. (J. Amer. Chem. Soc. 128: 5949 (2006)) for $LiAlH_4$).

B. $AlCl_3$+$Et_2O$+3/2$H_2$→$AlH_3$-$Et_2O$+HCl↓→$AlH_3$+$Et_2O$↓

C. $AlH_3$+THF→$AlH_3$-THF↔→$AlH_y$-THF (where $0<y<3$).

Other Additives: The hydrogenation of Al may also be assisted by a low concentration ($\leq$ about 4 mol %) of other additives such as catalysts or dopants to form catalyzed Al, i.e., an aluminum/additive complex (Al*). Such additives may include, but are not limited to elements from the 3d and 4d transition metal series and serve to generate a metal-catalyzed Al species (Al*). When the metal is titanium, for example, the catalyzed Al is represented as Al(Ti). These additives may be introduced in the metallic state (e.g., Ti, Ni) or as compounds such as a metal salt (e.g., $TiCl_3$). The purpose of the low concentration of additive is to enhance the total quantity of hydrogen absorbed and desorbed and to increase hydrogenation-dehydrogenation reaction rates.

EXAMPLES OF THE PREFERRED EMBODIMENTS OF THE INVENTION

Example 1

We have devised a doping procedure to prepare an aluminum/additive complex comprising a titanium-catalyzed Al(Ti) in an Argon purged dry box. First, $AlH_3$ was prepared using the synthesis route of Brower et al. (1976), which involves reacting $LiAiH_4$ with $AlCl_3$ in ether. We modified that synthesis by the addition of ethereal $TiCl_3$ to give a final $Al_{0.98}Ti_{0.02}$ ratio. Upon the addition of the $TiCl_3$ there was an immediate release of hydrogen indicating decomposition of $AlH_3$ and/or $LiAlH_4$. Upon removal of ether and by drying for 1 hour at 80° C., a black, titanium-catalyzed Al(Ti) powder was produced. The drying step completely decomposed any residual $AlH_3$ as indicated by x-ray diffraction (XRD) of the black powder which showed only the presence of Al. The exact state of Ti in the Al metal is not known at this time.

Synthesis of the $AlH_3$ adduct of Triethylenediamine (TEDA): Hydrogenation and dehydrogenation reactions were carried out in a 300 ml stainless steel stirred reactor (Parr Instruments) rated for 200 atm. maximum operating pressure. The reactor was loaded in an Ar filled glove box with 1.5 g of Al(Ti), 17 g of TEDA and 90-100 ml of THF. TEDA is completely soluble in THF while Al(Ti) is not. The reactor was sealed, removed from the glove box and attached to a gas-vacuum manifold and quickly evacuated to remove most of the argon remaining in the reactor. Hydrogen gas was added to the reactor at pressures of about 35-60 atm. Thermocouples were used to monitor the internal and external temperatures and the gas pressure in the reactor was measured using a pressure transducer. The course of the reaction was monitored by recording the drop in $H_2$ pressure as a function of time. After the reactions were complete the product was recycled or the reactor contents were removed in the glove box and the solids were separated by filtration and washed with ether; both the solid and liquid phases were further characterized as required.

During hydrogenation of the Ti-catalyzed Al metal, a white/gray solid of TEDA-$AlH_3$ precipitated out of solution. The solid reaction products were analyzed using powder X-ray diffraction. The analysis showed that no trace of the original Al or TEDA was present, confirming the reaction went to completion. Fourier Transform Infrared (FTIR) spectra of the product were acquired on a Perkin-Elmer Spectrum One Spectrometer and indicated the presence of the $AlH_3$ functional group. H analysis of the product was carried out by thermal decomposition using a Toepler pump to drive evolved $H_2$ through a liquid $N_2$ cold trap into a calibrated reservoir and indicated a H/Al ratio of 3.0. Other experiments performed with dodecane in place of THF showed similar results demonstrating the reaction with Ti-activated Al proceeds in non-polar as well as polar solvents. It is likely that other amine compounds exist that will react with the catalyzed (Ti-activated) Al to form reversible amine alanes.

Example 2

The process of Example 1 was repeated to prepare the $AlH_3$ adduct of TEDA using undecane as a solvent. This solvent has a vapor pressure of 0.025 atm at 88°, thus the $AlH_3$ adduct can be can be readily decomposed by removing $H_2$ from the system without excessive loss of solvent or TEDA. The adduct can be easily regenerated by cooling to 25° C. and re-introducing $H_2$.

Example 3

The process of Example 1 was repeated to prepare the $AlH_3$ adduct of Quinuclidine (5 g charge). The product was soluble in the THF solvent which was removed by slight heating under a reduced pressure. The product was a white solid having a H/Al ratio of 1.89. FTIR analysis indicated the presence of the $AlH_3$ functional group.

Example 4

The process of Example 1 was repeated to prepare the $AlH_3$ adduct of hexamethyl-tetramine. In this case the weight of the amine charge was 10 g. The amine is only sparingly soluble in THF nevertheless the reaction proceeded. The final H/Al ratio was 1.60. The product was not readily soluble in any inert organic solvent. FTIR indicated the presence of the $AlH_3$ functional group.

Example 5

The process of Example 1 was repeated to prepare the $AlH_3$ adduct of Dimethylethylamine. The product was soluble in the THF solvent. The liquid was analysed using FTIR which indicated the presence of the $AlH_3$ functional group.

Example 6

A Hydrogenation of Ti-catalyzed Al (as in example 1) and trimethylamine (TMA) was performed in a 100 ml stainless steel stirred reactor rated for 400 atm. maximum operating pressure. The reactor was loaded in an Ar filled glove box with 1 g of Al(Ti), and 40 ml of diethylether. 10-20 g of TMA was added to the reactor by evacuating and cooling the reactor to approximately −40 C. A cylinder of TMA gas (~14 psi) was connected to the reactor and the gas/liquid was allowed to flow into the reactor. Hydrogen gas was added to the reactor at a pressure of about 300 atm and the solution was stirred for approximately 12 hours at room temperature. After the reactions were complete the solid product ($AlH_3$-TMA) was isolated from the solvent by vacuum drying. A similar process was used to form $AlH_3$-TMA in toluene instead of diethyl ether.

Example 7

$AlH_3$-TMA adducts of Example 6 were converted to $AlH_3$-triethylamine (TEA) adducts by transamination reactions similar to those originally described by Murib et al. (U.S. Pat. No. 3,642,853). $AlH_3$ was recovered from the $AlH_3$-TEA adduct by precipitation or by vacuum drying.

Example 8

The complete regeneration of $LiAlH_4$ from LiH, Al and $H_2$ gas was achieved using the following procedure. Ti catalyzed Al was prepared as described in Example 1. The reactor was loaded with 0.59 g of LiH ($7.4 \times 10^{-2}$ mols) and 1.0 g of Al(Ti) ($3.7 \times 10^{-2}$ mols) along with 90 ml THF and sealed under Ar and attached to a gas-vacuum manifold. The reactor was flushed with $H_2$ gas three times to remove the blanket of inert gas. $H_2$ gas was added to the reactor at pressures greater than or equal to 1 atm and the solution was stirred for at least 12 hours. The product consisted of $LiAlH_4$ dissolved in THF. The second regeneration step involves removing the THF from the $LiAlH_4$. The $LiAlH_4$/THF solution was initially dried in a flask under vacuum at room temperature to remove excess THF. The remaining $LiAlH_4$/THF solvate was transferred to a rotary furnace and desolvated by heating to 333 K for approximately 4 hours under vacuum. The full regeneration procedure is shown below in Equation (7) where Al* is an aluminum/additive complex, e.g. Al(Ti):

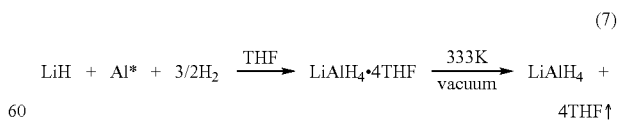

(7)

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A method of preparing alane ($AlH_x$), where x is greater than 0 and less than or equal to six, from aluminum (Al) and molecular hydrogen ($H_2$) at substantially reduced $H_2$ gas pressure comprising:
   a) exposing catalyzed Al, wherein said catalyzed Al comprises an aluminum/additive complex wherein the additive comprises either a 3d or 4d transition metal, to $H_2$ under conditions of temperature and pressure appropriate for the reaction between the $H_2$ and said catalyzed Al in the presence of a stabilizing molecule (S) to form an AlHx-S adduct;
   b) separating the stabilizing molecule from the $AlH_x$; and
   c) recovering the alane resulting from the reaction.

2. The method according to claim 1 wherein the transition metal is provided in a metallic state or as a metal salt.

3. The method according to claim 2 wherein the transition metal is titanium.

4. The method according to claim 1 wherein the transition metal additive is equal to or less than about 4 mole percent.

5. The method according to claim 1 wherein the stabilizing molecule comprises a non-aqueous solvent.

6. The method according to claim 5 wherein the solvent comprises amine groups, amide groups, or hydroxyl groups.

7. The method according to claim 5 wherein the solvent comprises an oxygen-based solvent selected from the group consisting of ethers and ketones.

8. The method according to claim 5 wherein the solvent is selected from the group consisting of diethyl ether, tetrahydrofuran, dibutyl ether, undecane, toluene and ethylene glycoldimethyether.

9. The method according to claim 6 wherein the solvent comprises tetrahydrofuran (THF), triethylamine, ethylenediamine, dimethylethylamine, trimethylamine, tetramethylethylenediamine, quinuclidine, hexamine, ethylene glycoldimethylether, diethylethylene diamine, or triethyl Al.

10. The method according to claim 1 wherein the stabilizing molecule is triethylamine, ethylenediamine, dimethylethylamine, trimethylamine, tetramethylethylenediamine, quinuclidine, hexamine, or diethylethylenediamine, or mixtures thereof.

11. The method according to claim 10 optionally further including a transamination step in which a first stabilizing molecule is used in step a) and is then displaced by a second stabilizing molecule prior to steps b) and c).

12. The method according to claim 11 wherein said first stabilizing molecule is ethylenediamine, dimethylethylamine, trimethylamine, tetramethylethylenediamine, quinuclidine, hexamine, or diethylethylenediamine and said second stabilizing molecule is triethylamine.

13. The method according to claim 1 wherein the stabilizing molecule is separated from the alane by vacuum drying.

14. The method according to claim 1 wherein the alane is recovered by precipitation from the $AlH_x$ adduct.

15. A method of preparing alane ($ALH_x$), where x is greater than 0 and less than or equal to six, from aluminum (Al) and molecular hydrogen ($H_2$) at substantially reduced $H_2$ gas pressure comprising:
   a) exposing catalyzed Al, wherein said catalyzed Al comprises an aluminum/titanium additive complex, to $H_2$ under conditions of temperature and pressure appropriate for the reaction between the $H_2$ and said catalyzed Al in the presence of a stabilizing molecule (S) to form an $AlH_x$—S adduct;
   b) separating the stabilizing molecule from the $AlH_x$; and
   c) recovering the alane resulting from the reaction.

16. The method according to claim 15 wherein the titanium additive is provided in a metallic state or as a salt.

17. The method according to claim 15 wherein the stabilizing molecule is selected from the group consisting of tetrahydrofuran (THF), triethylamine, ethylenediamine, triethylenediamine, dimethylethylamine, trimethylamine, tetramethylethylenediamine, quinuclidine, hexamine, ethylene glycoldimethylether, diethylethylene diamine, and mixtures thereof.

* * * * *